United States Patent [19]

Ishii et al.

[11] 4,200,726
[45] Apr. 29, 1980

[54] SEMIPERMEABLE MEMBRANE OF PHENOXY RESIN CONTAINING SULFURIC ACID GROUPS OR SALTS THEREOF

[75] Inventors: Kiyoshi Ishii; Ryoshu Suzuki; Zenjiro Honda; Hitoshi Tsugaya, all of Saitama, Japan

[73] Assignee: Daicel Ltd., Osaka, Japan

[21] Appl. No.: 910,877

[22] Filed: May 30, 1978

[30] Foreign Application Priority Data

Jun. 1, 1977 [JP] Japan .................................. 52-64427

[51] Int. Cl.² .................... B01D 13/00; B01D 13/02; B01D 13/04; C08G 65/40
[52] U.S. Cl. ................................ 528/99; 210/500 M; 528/102; 528/104; 528/109; 528/125; 528/128; 528/171; 528/172; 528/174; 528/175
[58] Field of Search ............... 528/109, 171, 172, 175, 528/174, 125, 128, 99, 102, 104; 210/500 M

[56] References Cited

U.S. PATENT DOCUMENTS

| | | | |
|---|---|---|---|
| 3,994,860 | 11/1976 | Brousse | 528/175 |
| 4,054,707 | 10/1977 | Quentin | 528/174 |

FOREIGN PATENT DOCUMENTS 1545071  5/1970  Fed. Rep. of Germany ........... 528/109

Primary Examiner—Lester L. Lee
Attorney, Agent, or Firm—Blanchard, Flynn, Thiel, Boutell & Tanis

[57] ABSTRACT

A semipermeable membrane composed of a water-insoluble, membrane-forming polymer (hereinafter referred to as "polymer (II)") which is obtained by partially converting the hydroxyl groups of a polymer represented by the following formula (hereinafter referred to as "polymer (I)"):

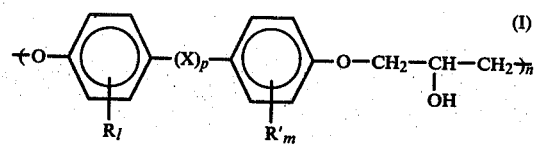

wherein R and R' are halogen, nitro, methyl or ethyl, X stands for a divalent group selected from methylene, ethylene, isopropylidene, ether (—O—), carbonyl (—CO—), sulfide (—S—), sulfoxide (—SO—) and sulfone (—SO$_2$—), l and m are integers of from 0 to 4, p is 0 or 1, and n is an integer of from 100 to 1000, to sulfuric acid groups or alkali metal, ammonium or nitrogen-containing basic organic compound salts thereof.

12 Claims, 1 Drawing Figure

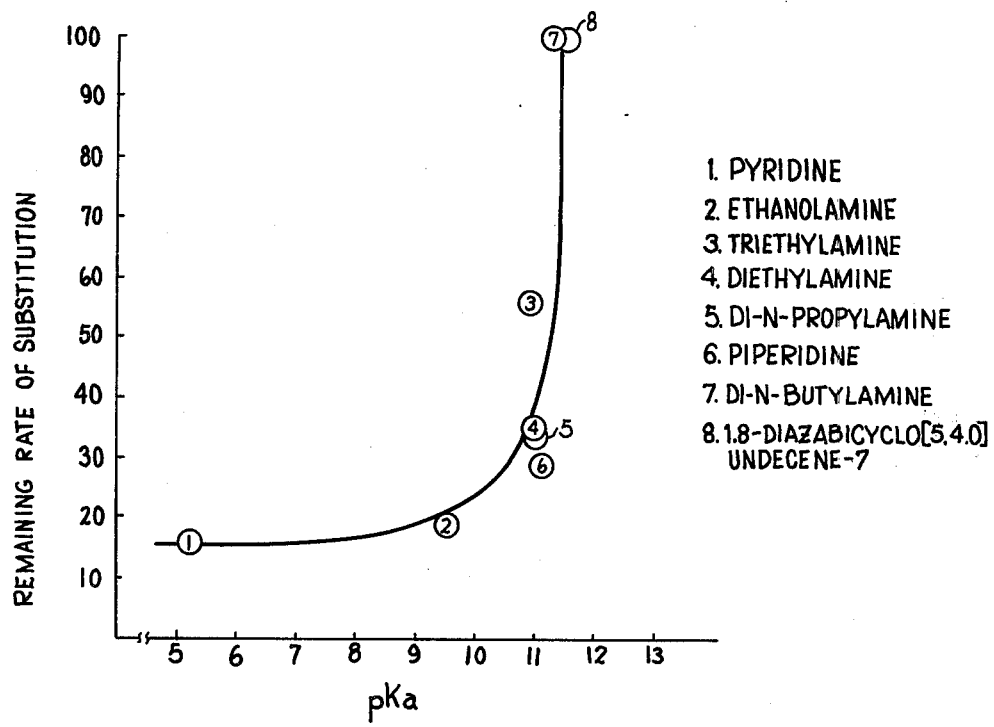

SEMIPERMEABLE MEMBRANE OF PHENOXY RESIN CONTAINING SULFURIC ACID GROUPS OR SALTS THEREOF

BACKGROUND OF THE INVENTION

1. Field of the Invention

The present invention relates to a semipermeable membrane made of a special polymer.

2. Description of the Prior Art

As a reverse osmosis membrane heretofore used for the desalination of sea water and salt water and for the separation of various inorganic salts and organic compounds from solutions, there is known a so-called Loeb-type membrane made of hydrous acetyl cellulose and having an asymmetric structure including a dense and compact surface skin layer and a porous substrate layer. The Loeb-type membrane can be formed into a plate-like product, a spiral coil, a tubular product or a hollow fiber. The Loeb membrane has a sufficiently high capacity for practical use. However, this membrane is disadvantageous because it is readily hydrolyzed by an acid or alkali and/or it is readily decomposed by microorganisms. Accordingly, when the membrane is placed in practical use, the pH of the solution to be treated should be adjusted to from 3 to 7 so that the acetyl cellulose will not be hydrolyzed. Further, when the membrane is not in use, it must be stored in an aqueous solution of a fungicidal or bacteriostatic chemical.

As another example of a reverse osmosis membrane that is in practical use, there can be mentioned a reverse osmosis membrane in the form of a hollow fiber, which is made from an aromatic polyamide. This membrane is disadvantageous because it is readily decomposed by a very small amount of chlorine. Therefore, chlorine must be removed from the solution that is to be brought in contact with this type of membrane.

We have discovered a reverse osmosis semipermeable membrane possessing the advantages of the Loeb membrane, but which eliminates the foregoing-described defects of the known membranes.

Since reverse osmosis is performed using a feed liquid which is under a high pressure, in order to maintain stable the properties of the semipermeable membrane used for the reverse osmosis, it is necessary that compaction of the semipermeable membrane should not occur in the presence of water under a high pressure. Accordingly, a polymer suitable for making the membrane should be stiff enough to resist high pressure in the presence of water and it should contain hydroxyl groups necessary for attaining a sufficient water permeation speed. For example, a commercially available phenoxy resin manufactured by Union Carbide Corporation and having the formula:

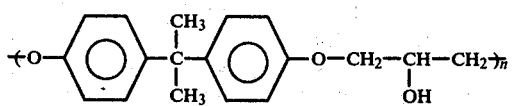

is very stiff because benzene nuclei are present in the main chain of the polymer. Further, since the hydroxyl groups are present as side chains, this resin has a hydrophilic property.

We have examined the suitability of this phenoxy resin as a material for making a reverse osmosis membrane. As a result, it was found that a phenoxy resin of the foregoing formula possesses an inferior hydrophilic property and the required water permeation speed of a reverse osmosis membrane cannot be attained therewith. Therefore, the phenoxy resin of the foregoing formula, per se, is not suitable as a material for making a reverse osmosis semipermeable membrane. We have discovered, however, that when a semipermeable membrane is made of a polymer obtained by partially replacing the hydroxyl groups of the phenoxy resin of the foregoing formula by at least one substituent selected from sulfoalkyl ether groups, sulfoaryl ether groups, sulfoaralkyl ether groups and salts thereof with an alkali metal, ammonium or nitrogen-containing basic organic compound, the semipermeable membrane has an excellent semipermeable characteristic and the foregoing disadvantages of the conventional acetyl cellulose and aromatic polyamide membranes are overcome.

However, a membrane composed of a polymer formed by partially replacing the hydroxyl groups of the phenoxy resin of the above-formula, with a sulfoalkyl ether group, a sulfoaryl ether group and/or a sulfoaralkyl ether group is disadvantageous in that the reduction of the water permeability of this membrane with the passing of time is conspicuous in comparison with the conventional acetyl cellulose membrane and, hence, this membrane is inferior to the conventional acetyl cellulose membrane with respect to its resistance to compaction under pressure and its creep resistance when used for a long time.

We have discovered a semipermeable membrane which is free from these defects. We have found that a polymer obtained by partially converting the hydroxyl groups of the phenoxy resin of the above-mentioned formula by a sulfuric acid group or a salt thereof with an alkali metal, ammonia or a nitrogen-containing basic organic compound, has an excellent water-permeating property. Moreover, the disadvantages of the conventional acetyl cellulose and aromatic polyamide membranes, and the membranes of the above-mentioned polymers obtained by partially replacing the hydroxyl groups by a sulfoalkyl ether group, a sulfoaryl ether group and/or a sulfoaralkyl ether group, are completely eliminated in a semipermeable membrane made of this polymer. This polymer is unexpectedly superior as a membrane-forming material in comparison with the conventional acetyl cellulose and aromatic polyamides, and the above-mentioned modified phenoxy resin. We have now completed the present invention based on these findings.

More specifically, in accordance with the present invention, there is provided a semipermeable membrane made of a water-insoluble, membrane-forming polymer, hereinafter referred to as "polymer (II)", which is obtained by partially converting the hydroxyl groups of a polymer having the following formula, hereinafter referred to as "polymer (I)":

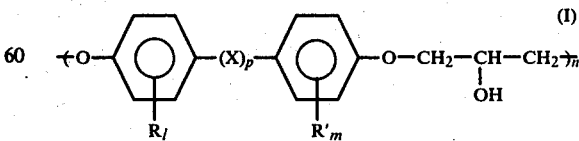

wherein R and R' are halogen, nitro, methyl or ethyl, X is a divalent group selected from methylene, ethylene, isopropylidene, ether (—O—), carbonyl (—CO—), sulfide (—S—), sulfoxide (—SO—) and sulfone (—SO$_2$—), l and m are integers of from 0 to 4, p is 0 or 1, and n is an integer of from 100 to 1000, to sulfuric acid groups or salts thereof with an alkali metal, ammonium or a nitrogen-containing basic organic compound.

The term "semipermeable membrane", used in the specification and claims, means a membrane having a selective permeability, which can be used for such membrane separation processes as reverse osmosis, ultra-filtration, dialysis and electrodialysis.

The semipermeable membrane of the present invention will now be described in detail.

The starting polymer (I) that is used for preparing the material polymer (II) used to make the semipermeable membrane of the present invention is a polymer obtained by reacting a dihydric phenol with epichlorohydrin (West German Patent Publication No. 1,545,071) or by reacting a phenoxy resin formed by reaction between a dihydric phenol and epichlorohydrin, with a dihydric phenol (British Pat. No. 980,509). The starting polymer has the formula (I):

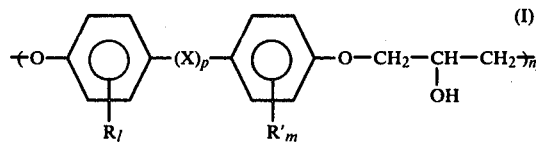

In the formula (I), R and R' each are halogen, particularly chloro or bromo, nitro, methyl or ethyl, and l and m are integers of from 0 to 4. When the number of the substituents R or R' is two or more, these substituents can be the same or different. X is methylene, ethylene, isopropylidene, ether (—O—), carbonyl (—CO—), sulfide (—S—), sulfoxide (—SO—) or sulfone (—SO$_2$—), and p is 0 or 1 and n is an integer of from 100 to 1000.

Examples of suitable dihydric phenols are bisphenols such as bis(4-hydroxyphenyl)-methane, bis(4-hydroxy-3-methylphenyl)-methane, bis(4-hydroxy-3,5-dichlorophenyl)-methane, bis(4-hydroxyphenyl)-ketone, bis(4-hydroxydiphenyl)-sulfide, bis(4-hydroxyphenyl)-sulfone, 4,4-dihydroxy-phenyl ether, 1,2-bis(4-hydroxyphenyl)-ethane, 2,2-bis(4-hydroxyphenyl)-propane, 2,2-bis(4-hydroxy-3-methylphenyl)-propane, 2,2-bis(4-hydroxy-3-chlorophenyl)-propane, bis(4-hydroxyphenyl)-phenylmethane, bis(4-hydroxyphenyl)-diphenylmethane, bis(4-hydroxyphenyl)-4'-methylphenylmethane, 1,1-bis(4-hydroxyphenyl)-2,2,2-trichloroethane, bis(4-hydroxyphenyl)-(4'-chlorophenyl)-methane, 1,1-bis(4-hydroxyphenyl)-cyclohexane, bis(4-hydroxyphenyl)-cyclohexylmethane, 4,4'-dihydroxydiphenyl and 2,2'-dihydroxydiphenyl. These bisphenols can be used singly or in the form of mixtures of two or more of them.

The polymer (II) used to make the semipermeable membrane of the present invention can be prepared by partially converting the hydroxyl groups of the starting polymer (I) having the above formula (I), to a sulfuric acid group, a salt thereof with an alkali metal, ammonium or a nitrogen-containing basic organic compound or a mixture thereof. The substituents formed by such conversion are represented by the following formulae:

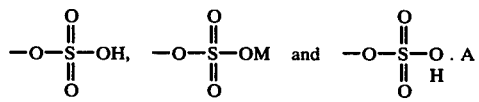

wherein M is an alkali metal such as Na, K or Li, and A is ammonia or a nitrogen-containing basic organic compound such as aliphatic primary amines such as methylamine, ethylamine, propylamine, isopropylamine, butylamine, isobutylamine, sec-butylamine, tert-butylamine, pentylamine, isopentylamine, hexylamine, 2-ethylhexylamine and laurylamine; aliphatic secondary amines such as dimethylamine, diethylamine, dipropylamine, diisopropylamine dibutylamine, N-methylethylamine and N-ethylisobutylamine; tertiary amines such as trimethylamine, triethylamine, N,N-dimethylpropylamine, tributylamine and N-ethyl-N-methylbutylamine; mono-, di- and tri-ethanolamine; diethylaminoethanol; urea; β-dimethylaminopropionitrile; aliphatic quaternary ammonium compounds such as tetramethylammonium and tetraethylammonium; alicyclic amine compounds such as cyclohexylamine, N,N-dimethylcyclohexylamine, and dicyclohexylamine; aromatic primary amines such as aniline, o-toluidine, m-toluidine, p-toluidine, o-ethylaniline, m-ethylaniline, p-ethylaniline, p-isopropylaniline and p-t-butylaniline; aromatic secondary amines such as N-methylaniline, N-ethylaniline and N,N-dimethylaniline; aromatic quaternary ammonium compounds such as trimethylphenyl ammonium and ethyldimethylphenyl ammonium; aralkyl amines such as benzylamine and α-methylbenzylamine; nitrogen-containing hetrocyclic compounds such as pyrrole, 1-methylpyrrole, indole, pyridine, α-picoline, β-picoline, γ-picoline, 2-ethylpyridine, quinoline, piperidine, 1-methylpiperidine, 2-methylpiperidine, 1,8-diazabicyclo[5.4.0]undecene-7 and morpholine.

The conversion is generally accomplished by (1) dissolving the polymer (I) in a solvent, such as tetrahydrofuran, dioxane or N,N-dimethylformamide, (2) adding to the solution, at a temperature lower than room temperature, chlorosulfonic acid or anhydrous sulfuric acid in an amount of from 15 to 100 mole %, based on the hydroxyl groups of the starting polymer (I) and (3) conducting the reaction for 1 to 3 hours. After completion of the reaction, the reaction mixture is added dropwise into water or a non-solvent, such as an alcohol, whereby to precipitate the resulting polymer, wherein the hydroxyl groups of the starting polymer (I) have been transformed to

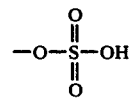

groups. If a hydroxide of the above-mentioned alkali metal, or ammonia or a nitrogen-containing basic organic compound as mentioned above is added to the above reaction mixture in an amount of from 2.5 to 5 moles, per mole of anhydrous sulfuric acid or chlorosulfonic acid used for the reaction, the substituted sulfuric acid group is converted to an alkali metal salt, or ammonium salt or a quaternary ammonium salt of the nitrogen-containing basic organic compound. The recovered polymer is washed with water and is dried, preferably at a temperature below 50° C. The sulfated phenoxy resin is readily hydrolyzed when the terminal group is a sulfuric acid group (—OSO$_3$H), and its stability is low when it is allowed to stand. However, if the terminal sulfuric acid group is converted to a salt, the resin is stabilized. Therefore, it is preferred that the sulfuric acid group is converted to an alkali metal salt, or ammonium salt or a quaternary salt of a nitrogen-containing basic organic compound.

The starting polymer (I) can be identified by NMR analysis and IR analysis. Confirmation of the introduction of substituents present in the polymer (II) of the present invention and determination of the quantity of the introduced substituents are performed by sulfur analysis of the sulfuric acid groups, NMR analysis of the substituted methine groups or the organic compound forming the salt with the sulfuric acid group or by neutralizing titration.

The thus-obtained polymer (II) is a novel macromolecular compound which, so far as is known, is not disclosed in any literature reference.

The process for preparing a semipermeable membrane from the thus-obtained polymer (II) will now be described.

The casting process is most preferred for forming a membrane. The membrane of the present invention can be uniform or homogeneous in cross-section or it can be an asymmetric (skinned) membrane having an improved water-permeating property, which asymmetric membrane comprises a dense and compact surface skin layer and a porous supporting layer, like a Loeb membrane. The membrane of the former (homogeneous) type can be obtained by dissolving the polymer in a single solvent, casting the solution onto a substrate having a smooth surface, such as a glass sheet, a metal plate, a sheet of a synthetic resin inert to the solvent or a porous sheet, and then gradually evaporating the solvent in a vessel covered with a filter paper or the like. The membrane of the asymmetric type is obtained by dissolving the polymer in a single solvent or a mixed solvent comprising at least two solvents differing in their boiling points, casting the solution onto a substrate such as the substrates mentioned above, removing a part of the solvent by evaporation and treating the cast layer in a coagulating bath. As the solvent, there can be mentioned those as listed in the following Table 1.

Those solvents can be used singly or in the form of a mixed solvent comprising two or more of them.

A low-boiling-point organic compound having a good compatibility with such solvent and a non-solvent of the type used for the coagulating bath can be added to the polymer solution prior to casting, provided that the solubility of the polymer is not lowered. As such organic compound, there can be mentioned, for example, alcohols such as methanol, ethanol and isopropanol, ethers such as tetrahydrofuran and dioxane, and ketones such as acetone and methylethyl ketone. Also water can be used for the same purpose. As the non-solvent used for the coagulating bath, water is ordinarily used, but organic solvents having a coagulation value lower than 100, such as alcohols, e.g., methanol, ethanol and isopropyl alcohol, can be used. The term coagulation value used herein indicates the amount (parts by weight) of the non-solvent or mixed non-solvent necessary for rendering opaque a solution containing 1% by weight of the polymer, when the non-solvent or mixed non-solvent is gradually added to 100 parts by weight of said polymer solution.

A composite (laminate-type) semipermeable membrane can be prepared by forming an ultra-thin membrane of the polymer (II) of the present invention on a preformed porous membrane. In this case, the preformed porous membrane used should have on the surface thereof pores having a size of up to 1μ, preferably up to 0.5μ and also it should not be dissolved in the solvent used in the casting solution.

As such porous membranes, there can be mentioned a porous polypropylene membrane (manufactured and marketed under the tradename "Juraguard ®" by Polyplastics K.K.), a porous polyphenylene-oxide membrane (manufactured and marketed under the tradename "Neclepore ®" by Nomura Microscience K.K.), and porous membranes composed of polysulfone, cellulose triacetate and other synthetic resins. The ultrathin membrane of the polymer (II) formed thereon has a thickness smaller than 3μ, preferably smaller than 0.5μ. It can be a uniform (homogeneous) membrane or an asymmetric membrane comprised of a dense and compact surface skin layer and a porous underlying layer.

This composite semipermeable membrane is obtained by casting onto a preformed porous membrane, such as those mentioned above, a solution containing 0.1 to 5% by weight, preferably 0.5 to 3% by weight, of the polymer (II) dissolved in a single solvent or mixed solvent by means of a glass rod or doctor blade, evaporating a part or all of the solvent, and dipping the coated porous membrane in a coagulating bath as mentioned above.

In the production of the polymer (II), 15 to 90%, preferably 20 to 85%, of the hydroxyl groups of the polymer (I) should be transformed to sulfuric acid groups or salts thereof with an alkali metal, ammonia or nitrogen-containing basic organic compound.

Thus, the polymer (II) has the formula

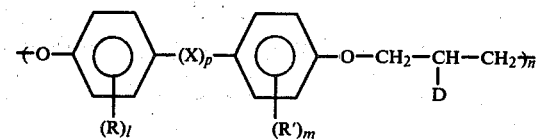

wherein R, R', X, l, m, p and n have the same meanings as defined above, and wherein from 15 to 90% of said D groups are sulfuric acid groups or salts thereof with an alkali metal, ammonium or nitrogen-containing basic compound and the balance of said D groups are hydroxyl groups.

The present inventors have found that the polymer (II) is remarkably affected in respect of its solubility, film-forming property and resistance to hydrolysis owing to the introduction of the sulfuric acid group or a salt thereof with an alkali metal, ammonium or nitrogen-containing basic organic compound, in place of the hydroxy groups of the polymer (I). The polymer (II) having only sulfuric acid groups can be formed into films. However, it is somewhat susceptible to hydrolysis in the procedure used for the preservation and preparation of the film. It has been examined how the polymer (II) salt with sodium, ammonium, dimethylamine or pyridine is soluble in various solvents as listed in Table 1. When the asymmetric film is prepared, the selection of a solvent to be used is significant. In general, there can be used a larger number of solvents when the polymer (II) salt is a salt of a nitrogen-containing basic organic compound such as pyridine and dimethylamine, than can be used with ammonium and sodium salts.

In addition, the polymer (II) salt with a nitrogen-containing basic organic compound has a smaller rate of hydrolysis, according as the pKa value of the nitrogen-containing basic organic compound is greater. The hydrolysis is measured by allowing the polymer, in the form of flakes, to stand at 60° C., at 100% relative humidity for 20 days and determining the remaining amount of substitution. The results are illustrated in the drawing.

BRIEF DESCRIPTION OF THE DRAWING

The drawing is a graph showing the remaining amount of substitution versus the pKa value of the nitrogen-containing basic organic compound used as the salt-forming moiety of polymer (II).

The properties of the polymer (II) as a semipermeable membrane, according to this invention, can be modified by immersing it in an aqueous solution or an organic solvent which contains a cross-linking agent in order to cross-link the polymer (II). As the cross-linking agent, there can be used melamine resins such as dimethylolmelamine, trimethylolmelamine, tetramethylolmelamine, pentamethylolmelamine, hexamethylolmelamine and methoxy-, ethoxy-, propoxy- or butoxy-compounds Table 1

| | SOLUBILITY OF POLYMERS II | | | |
|---|---|---|---|---|
| Solvent | Salt pyridine salt | dimethylamine salt | ammonium salt | sodium salt |
| N,N'-dimethylformamide | ○ | ○ | ◉ | ◐ |
| N,N'-dimethylacetoamide | ○ | ○ | ◉ | ● |
| dimethylsulfoxide | ○ | ○ | ◐ | ○ |
| hexamethylphosphoamide | ○ | ○ | ◐ | ○ |
| 2-pyrrolidone | ○ | ○ | ○ | ○ |
| formamide | ○ | ○ | ○ | ○ |
| pyridine | ○ | ○ | ○ | △ |
| dimethylaniline | △ | △ ~ x | x | x |
| furfuryl alcohol | ○ | ○ | △ | x |
| furfural | ○ | ○ | x | x |
| 2-ethoxyethanol | ○ | ○ | ◉ | . ● |
| acetone | △ | △ | x | x |
| dioxane | △ ~ x | △ ~ x | △ ~ x | △ ~ x |
| methylal | ○ ~ △ | △ ~ x | △ ~ x | x |
| anisol | △ | △ | x | x |
| methanol | x | x* | x | x |
| isopropyl alcohol | △ | △ | x | x |
| N-methylpyrrolidone | ○ | ○ | ◉ | ● |
| tetramethylurea | ○ | ○ | ◐ | ● |
| ethylenecyanohydrin | ○ | ○ | ● | ◐ |
| piperidine | △ | △ | △ | x |
| morpholine | ◐ | ◐ | ◉ | △ |
| γ-butyrolactone | ○ | ○ | ◉ | ● |
| lutidine | ◐ | ◉ | ◉ | △ |
| trimethyl phosphate | ○ | ◐ | ◉ | ● |
| tetrahydrofurfuryl alcohol | ○ | ○ | ● | ◐ |
| cyclohexylamine | ○ | △ | △ | △ |
| diacetone alcohol | ○ | ◐ | ◐ | ◐ |
| aniline | ○ | ○ | ◉ | |

Note:
*heated
Evaluation Criteria:
　completely soluble
　soluble, however slightly muddy
　soluble, however muddy
△ only swelled
x insoluble As the amount of the hydroxyl groups transformed to sulfuric acid or salt groups to obtain polymer (II) is increased, the water content of a uniform (homogeneous) membrane formed from the polymer (II) increases and also the water flux rate of the uniform membrane increases, but the mechanical strength of the uniform membrane when dipped in water is reduced.

The term "water content" referred to herein means the water content of the uniform (homogeneous) membrane which has been dipped in pure water for 3 days. The term "mechanical strength" used herein includes tensile strength and tensile modulus.

When more than 85% of the hydroxyl groups are transformed to the above-mentioned groups in the polymer (II), if a uniform (homogeneous) membrane prepared from this polymer (II) is dipped in water, the membrane becomes swollen and either the tensile strength or the tensile modulus of the membrane is reduced to less than 10% of the tensile strength or tensile modulus of a membrane made of the unsubstituted starting polymer (I) when the latter membrane is similarly dipped in water. Accordingly, such membrane cannot be put into practical use.

thereof and urea derivatives of the foregoing such as dimethylolurea, tetramethylolurea and urea resins of condensates thereof, benzoguanamine resins such as dimethylolbenzoguanamine and dimethoxymethylolbenzoguanamine, amino resins mixed therewith, aldehydes such as formaldehyde, glyoxal, aldol and glycol aldehyde, and di- or tri-functional epoxides such as butadiene diepoxide, diglycidyl ether, glycol diglycidyl ether, glycerine diglycidyl ether, butanediol diglycidyl ether, resorcinol diglycidyl ether and tris(epoxypropyl)isocyanurate. In addition, it can be cross-linked with a divalent cation such as calcium, magnesium and barium derived from alkaline earth metal salts. The cross-linking improves the semipermeability, reduction of swelling of the membrane owing to an organic solvent, reduction of lowered membrane properties when it is used continuously for a long time and increase of mechanical strength.

If the amount of the hydroxyl groups transformed to the above-mentioned groups is lower than 15%, the water flux rate of the resulting uniform (homogeneous) membrane is reduced, and the membrane cannot be practically used as a reverse osmosis semipermeable membrane.

A uniform membrane of the polymer (II) of the present invention was prepared according to the above-mentioned method and the separation capacity of the membrane for aqueous solutions of various low-molecular-weight compounds was evaluated. In order to evaluate the separation capacity, the water permeation coefficient and the solute removal ratio were measured. The water permeation coefficient is represented by the following formula:

$$\frac{\text{(amount of permeated water)} \times \text{(membrane thickness)}}{\text{(time)} \times \text{(membrane area)} \times \text{(pressure)}}$$

And, the solute removal ratio is represented by the following formula:

$$\frac{\text{(solute concentration in starting solution)} - \text{(solute concentration in permeated solution)}}{\text{(solute concentration in starting solution)}} \times 100\ (\%)$$

The polymer (II) of the present invention has an excellent separation capacity and is useful as a material for a reverse osmosis membrane. It has been found that the separation capacity of the membrane of the present invention is comparable to the separation capacity of an acetyl cellulose membrane. As compounds that can be separated by the membrane of the present invention, there can be mentioned inorganic salts of mono- to hexa-valent metals, such as halides, nitrates, sulfates, phosphates, chromates, borates and carbonates, and various natural organic compounds such as alcohols, ketones, phenols, carboxylic acids and amines.

An acetyl cellulose membrane is readily oxidized by a chromate, and when the membrane is used for separation of chromates, deterioration of the membrane is caused and the properties of the membrane are degraded. Further, since the acetyl cellulose membrane has a very high affinity with lower carboxylic acids, the removal ratio of such acids is extremely reduced or shows a negative value. In contrast, a semipermeable membrane prepared from the polymer (II) of the present invention is very stable against various chemicals and shows a relatively high removal ratio to carboxylic acids.

The semipermeable membrane according to the present invention can be used for desalination of sea water, salt water and brine, for the tertiary treatment of waste water from a plating plant, and for treating pulp-containing waste water, waste water from a food processing plant, other various industrial waste waters and sewages, for desalination and purification for producing of ultra-pure water, and for concentration of soy milk, milk, syrups and juices of fruits such as tomato, grape, orange and apple.

The present invention will now be further described in detail by reference to the following illustrative Examples.

EXAMPLE 1

(i) Sulfation of Phenoxy Resin (I):

In a 4-neck separable flask having a capacity of 1 liter and equipped with a stirrer, a cooling pipe, a thermometer and a dropping funnel, 60.0 g of a phenoxy resin (PKHK manufactured by Union Carbide Corporation; X in the formula (I) stands for an isopropylidene group, l and m are zero and p is 1) was dissolved in 375.0 g of N,N-dimethylformamide. While the flask was being cooled by ice water so that the temperature of the solution was maintained below 25° C., 21.3 g of chlorosulfonic acid (purity=99%; 0.181 mole) was added dropwise to the solution over a period of 40 minutes, and then, the reaction was conducted at room temperature for 2 hours. Then, 33.3 g of pyridine (0.417 mole) was added dropwise to the reaction mixture over a period of 15 minutes, and aging was then conducted for 30 minutes to complete the reaction. Then, 60 g of N,N-dimethylformamide was added to the reaction mixture, and the mixture was added dropwise to 6 l of water to precipitate the polymer from the reaction mixture liquid. The formed polymer solids were washed two times with 6 l of water, then separated and recovered by a centrifugal separator, then dried at room temperature for 3 days by an air drier and further dried at 50° C. in vacuo for 1 day. Confirmation of the introduction of sulfuric acid groups and determination of the degree of sulfation were performed by determination of the pyridine nucleus proton in the NMR spectrum at 8–9 ppm, the S analysis and the neutralizing titration of electrolytic groups. It was found that the degree of substitution was 0.78 group per recurring unit and the electrolytic group capacity was 1.9 milligram equivalents.

(ii) Formation of Uniform (homogeneous) Membrane of Sulfated Phenoxy Resin:

In 25.5 g of pyridine was dissolved 4.5 g of the sulfated phenoxy resin obtained in step (i) above, and in a thermostat tank maintained at 50° C., the solution was cast on a horizontal casting glass sheet by using a doctor blade having a slit spacing of 250μ. The solution-cast glass sheet was covered with a glass cylinder having a top portion covered with a filter paper. The cast solution was dried in this state at 50° C. for 72 hours to form a uniform (homogeneous) membrane. When the uniform membrane was dipped in pure water for 3 hours, the water content was 34.9% by weight. The tensile modulus of the membrane was $1.03 \times 10^5$ psi.

(iii) Evaluation of Separation Capacity of Membrane:

The separation capacity of the uniform membrane of the sulfated phenoxy resin having a thickness of 29.5μ, which had been prepared in step (ii) above, was tested by using a circulation type reverse osmosis apparatus for flat membranes (S. Sourirajan, Ind. Eng. Chem, Fundam., 3, 206 (1964)), under a liquid feed pressure of 80 Kg/cm², using an aqueous solution containing 3500 ppm of NaCl, an aqueous solution containing 3500 ppm of Na₂SO₄, an aqueous solution of 2500 ppm of urea and an aqueous solution containing 2500 ppm of sucrose, respectively. The concentrations of NaCl and Na₂SO₄ were determined based on the electric conductivity, and the concentrations of urea and sucrose were determined by a TOC (total carbon) measuring device manufactured by Yuasa Denchi K.K. The results obtained are shown in Table 2. From these results, it is seen that the rejection or removal ratio of the membrane obtained in this Example is slightly lower than that of an acetyl cellulose membrane shown in Comparative Example 1 given hereinafter, but the water flux or water permeation coefficient is much higher than that of the acetyl cellulose membrane.

Table 2
CAPACITIES OF MEMBRANE OF EXAMPLE 1

| Run No. | Starting Solution | Capacities of Membrane | |
|---|---|---|---|
| | | water flux ($cm^2$/sec . atm) | rejection (%) |
| 1 | 3500 ppm NaCl aqueous solution | $9.4 \times 10^{-10}$ | 95.5 |
| 2 | 3500 ppm $Na_2SO_4$ aqueous solution | $8.1 \times 10^{-10}$ | 97.6 |
| 3 | 2500 ppm urea aqueous solution | $4.3 \times 10^{-10}$ | 80.5 |
| 4 | 2500 ppm sucrose aqueous solution | $3.3 \times 10^{-10}$ | 94.2 |

Comparative Example 1

A uniform membrane of acetyl cellulose having a thickness of 17.9μ was prepared in the same manner as described in step (ii) of Example 1 except that acetyl cellulose (E-398-3 manufactured by Eastman Kodak Co.) was used instead of the sulfated phenoxy resin and N,N-dimethyl-formamide was used instead of pyridine. The properties of the resulting membrane were evaluated according to the method described in step (iii) of Example 1 and the results shown in Table 3 were obtained.

Table 3
CAPACITIES OF MEMBRANE OF COMPARATIVE EXAMPLE 1

| Run No. | Starting Solution | Capacities of Membrane | |
|---|---|---|---|
| | | water flux ($cm^2$/sec . atm) | rejection (%) |
| 1 | 3500 ppm NaCl aqueous solution | $1.4 \times 10^{-10}$ | 96.0 |
| 2 | 3500 ppm $Na_2SO_4$ aqueous solution | $1.1 \times 10^{-10}$ | 99.1 |
| 3 | 2500 ppm urea aqueous solution | $2.5 \times 10^{-10}$ | 90.0 |
| 4 | 2500 ppm sucrose aqueous solution | $1.3 \times 10^{-10}$ | 99.2 |

Comparative Example 2

In 60 ml of anhydrous N,N-dimethylacetamide was dissolved 5.72 g of the same phenoxy resin as used in Example 1 (PKHK manufactured by Union Carbide Corporation) in a nitrogen atmosphere, and 0.768 g of sodium hydride (effective NaH=0.016 mole) dispersed in liquid paraffin was added to the solution and the reaction was conducted at 30° C. for 1 hour. Then, 1.952 g of propane sultone was added to the reaction mixture and the reaction was conducted at 30° C. for 3 hours. The reaction mixture liquid was filtered by a glass filter of G2 and the filtrate was reprecipitated from isopropanol. The precipitated polymer was washed with water for 30 minutes and dried. The degree of modification with sulfopropyl ether in the resulting polymer was determined by measurement of the propylene groups and titration of the electrolytic groups. It was found that the modification degree was 0.75 group per recurring unit of the phenoxy resin. In 25.5 g of N,N-dimethylformamide was dissolved 4.5 g of the thus-obtained polymer, and in a thermostat tank maintained at 50° C., the solution was cast onto a clean smooth horizontal glass sheet by using a doctor blade having a slit spacing of 250μ. The solution-cast glass sheet was covered with a glass cylinder having one end covered with a filter paper and the solvent was gradually evaporated. In this manner, drying was carried out at 50° C. for 72 hours. When the resulting film was dipped in pure water for 3 days, the water content was 35.2%, and the thickness was 29.7μ and the tensile modulus was $1.08 \times 10^5$ psi. The thus-obtained membrane and the membrane obtained in Example 1 were stored in the same manner as described above for a long time, and the capacities of both the membranes were compared. The results shown in Table 4 were obtained.

Table 4
Capacities Of Membranes Of Example 1 And Comparative Example 2 In Long-Time Reverse Osmosis

| Capacities | Uniform Membrane of Example 1 | Uniform Membrane of Comparative Example 2 |
|---|---|---|
| Capacity after 3 days | | |
| NaCl Rejection (%) | 97.8 | 97.3 |
| Water Flux ($cm^2$/sec . atm) | $7.4 \times 10^{-10}$ | $2.0 \times 10^{-10}$ |
| Capacity after 60 days | | |
| NaCl Rejection (%) | 97.5 | 95.2 |
| Water Flux ($cm^2$/sec . atm) | $7.0 \times 10^{-10}$ | $1.5 \times 10^{-10}$ |
| Water Permeability Retention Ratio (%) | 95 | 75 |

EXAMPLE 2

A polymer was prepared in the same manner as described in step (i) of Example 1 except that 19.3 g of chlorosulfonic acid was used. The polymer was found to have a sulfation degree of 0.64 group per recurring unit and an electrolytic group capacity of 1.654 milligram equivalents. The separation capacity of a uniform membrane having a thickness of 26.8μ, which had been prepared from this polymer, was characterized by a water flux of $7.20 \times 10^{-10}$ $cm^2$/sec.atm and an NaCl rejection of 95.8% when a 3500 ppm NaCl aqueous solution was used as the feed liquid.

EXAMPLE 3

(i) Synthesis of Phenoxysulfone Resin (X in the formula (I) is —$SO_2$—, l and m are zero, and p is 1):

A 0.2-liter, 4-neck round-bottomed flask equipped with a stirring motor, stirring glass blades, a thermometer, a nitrogen gas-introducing opening and a cooling pipe was charged with 62.50 g (0.30 mole) of bis-(4-hydroxyphenyl) sulfone, 27.76 g (0.3 mole) of epichlorohydrin, 93.76 g of ethanol, 13.52 g (0.338 mole) of sodium hydroxide and 57.0 g of water, and while the mixture was maintained at 40° C., reaction was carried out for 80 hours under agitation. Then, the mixture was heated and refluxed for 1 hour, and 36 ml of monochlorobenzene was added and the mixture was further refluxed for 2 hours. The polymer that separated from the solution and solidified was taken out and was dissolved in N,N-dimethylformamide at a concentration of about 5% by weight. The polymer was precipitated from the resulting solution by using methanol as a non-solvent. The polymer was recovered, washed with water and dried in vacuo at 50° C. for 2 days. The yield of the polymer was 57%, and the polymer had a reduced viscosity of 0.34 dl/g (as measured at a polymer concentration of 0.25 g/dl in N,N-dimethylacetamide).

(ii) Sulfation of Phenoxysulfone Resin:

The sulfation was carried out in the same manner as described in step (i) of Example 1 except that 56.1 g of the above phenoxysulfone resin was used instead of 60 g of the phenoxy resin used in Example 1 and the amount used of chlorosulfonic acid was changed from 21.3 g to 10.65 g. From the results of the NMR analysis and the neutralizing titration of the electrolytic groups, it was found that the thus-synthesized sulfated phenoxysulfone resin had a substitution degree of 0.39 group per recurring unit and an electrolytic group capacity of 1.06 milligram equivalents.

(iii) Evaluation of Separation Capacity of Membrane:

A uniform (homogeneous) membrane having a thickness of 25.9μ was prepared from the polymer obtained in step (ii) above in the same manner as described in step (ii) of Example 1, and the separation capacity of this membrane was evaluated. It was found that the water flux was $6.48 \times 10^{-10}$ cm$^2$/sec.atm and the NaCl rejection was 94.7%.

EXAMPLE 4

(i) Preparation of Porous Polysulfone Membrane:

In 225 g of N,N-dimethylformamide was dissolved 45 g of polysulfone (Polysulfone 1700 manufactured by Union Carbide Corporation), and the solution was cast in a thickness of 0.18 mm (7 mil) on a glass sheet. Then, the cast layer was dipped in an aqueous solution containing 2% by weight of N,N-dimethylformamide, which was maintained at 25° C., to effect gelation. After complete gelation, the membrane was taken out and air-dried at room temperature. The thus-obtained porous membrane had a pore diameter of 0.2 to 2μ and a thickness of 0.15 mm.

(ii) Preparation of Composite Membrane:

In 97 g of 2-methoxyethanol was dissolved 3 g of the sulfated phenoxy resin obtained in step (i) of Example 1, and the resulting solution was cast in a thickness of about 10μ onto the porous polysulfone membrane obtained in step (i) above while rotating a glass rod. The solution-cast porous membrane was dried in a thermostat tank maintained at 50° C. for 3 minutes to evaporate the solvent, and it was then dipped in ice water maintained at 0° C. for more than 30 minutes to obtain a composite membrane.

(iii) Properties of Composite Membrane:

The separation capacity of the composite membrane obtained in step (ii) above was tested in a circulation type reverse osmosis device for flat membranes, under a feed liquid pressure of 80 Kg/cm$^2$, by using a 3500 ppm NaCl aqueous solution. It was found that the water flux was 0.39 m$^3$/m$^2$.day and the NaCl rejection was 93.8%.

EXAMPLE 5

In a solution comprising 36.2 g of dioxane, 12.8 g of acetone, 7.0 g of maleic acid and 14.0 g of water there was dissolved 30 g of the sulfated phenoxy resin obtained in step (i) of Example 1, and the resulting polymer solution was cast onto a horizontal glass sheet by using a doctor blade having a slit spacing of 150μ. The film was dried at 20° C. for 30 seconds to evaporate a part of the solvent, and dipped in ice water maintained at 0° C. The thus-obtained asymmetric membrane was tested under a feed liquid pressure of 40 Kg/cm$^2$ in the same manner as described in step (iii) of Example 1 except that the surface of the membrane on the side placed in contact with air during the casting step was caused to face the high pressure starting feed liquid, namely, a 3500 ppm NaCl aqueous solution. It was found that the water flux was 1.34 m$^3$/m$^2$.day and the NaCl rejection was 94.6%.

COMPARATIVE EXAMPLE 3

The procedures of Example 3 were repeated in the same manner except that the amount used of chlorosulfonic acid in step (ii) of Example 3 was changed from 10.65 g to 3.2 g. The thus-synthesized sulfated phenoxysulfone resin had a substitution degree of 0.13 group per recurring unit. The separation capacity of a uniform (homogeneous) membrane prepared from this polymer was evaluated. It was found that the water flux was $0.75 \times 10^{-10}$ cm$^2$/sec.atm and the NaCl rejection was 68.3%.

COMPARATIVE EXAMPLE 4

The procedures of Example 1 were repeated in the same manner except that the amount used of chlorosulfonic acid was changed from 21.3 g to 27.0 g. The synthesized polymer had a substitution degree of 0.97 group per recurring group. A uniform (homogeneous) membrane prepared from this polymer was swollen when dipped in water, and therefore, the separation capacity of the membrane could not be determined.

EXAMPLE 6

The uniform membrane prepared in step (ii) of Example 1 was dipped in a 0.1 N sodium hydroxide aqueous solution for 72 hours, and the separation capacity of the thus-treated membrane was evaluated in the same manner as described in step (iii) of Example 1 by using a 3500 ppm NaCl aqueous solution. It was found that the water flux was $9.1 \times 10^{-10}$ cm$^2$/sec.atm and the NaCl rejection was 95.6%. Thus, it was confirmed that the separation capacity of the membrane was substantially as high as the separation capacity of the membrane that was not treated with the NaOH aqueous solution. By the NMR analysis, it was confirmed that in the membrane that was dipped in the NaOH aqueous solution, the sulfuric acid ester as the substituent was converted from the pyridine salt to the sodium salt.

Comparative Example 5

When the uniform (homogeneous) membrane obtained in Comparative Example 1 was dipped in a 0.1-N aqueous solution of sodium hydroxide for 72 hours, the membrane was swollen, and therefore, the separation capacity of the membrane could not be determined.

EXAMPLE 7

A membrane equivalent to the asymmetric membrane of Example 5 was dipped at 20° to 25° C. for 64 hours in a liquid having a pH of 2.5 and comprising 20 g of 40% glyoxal, 5 l of pure water and 1 g of 98% sulfuric acid, and was washed with water. The changes of the properties of the membrane caused by this dipping treatment are shown in Table 5.

EXAMPLE 8

A membrane equivalent to the asymmetric membrane of Example 5 was dipped in a liquid comprising 50 g of 38% aqueous formaldehyde, 350 ml of pure water and 100 g of 98% sulfuric acid at 70° to 80° C. for 2 hours, and the thus-treated membrane was washed with water, neutralized with an alkali and then washed with water again. The changes of the properties of the membrane caused by the above treatment are shown in Table 5.

Table 5

Changes Of Properties Of Membranes Caused By Aldehyde Treatment

| Membrane | Ratio of Value after Treatment to Value before Treatment | | |
|---|---|---|---|
| | NaCl Permeation Ratio (%) | Water Permeation Coefficient | Tensile Modulus |
| Membrane of Example 7 | 0.6 | 0.9 | 1.6 |
| Membrane of Example 8 | — | 0 | 4 |

Note:
The NaCl permeation ratio (%) is a value calculated according to the following formula:

NaCl permeation ratio (%) = 100−NaCl rejection (%)

EXAMPLE 9

Di-n-propylamine salt of phenoxy resin sulfate was obtained in the same manner as described in Example 1 step (i), except that the amount of chlorosulfonic acid was 17.6 g (0.150 mole) and 42.5 g (0.412 mole) of di-n-propylamine was used in place of pyridine. The sulfation degree of the product was 0.55 from S analysis. Then, 40 g of the thus-produced polymer was dissolved in a solution of 36 g of 2-methoxyethanol, 14 g of acetone, 5 g of ethylene glycol and 5 g of water. An asymmetric membrane was obtained from the resulting solution in the same manner as described in Example 5 and its properties as a membrane were examined. The results were a water flux of 0.64 m$^3$/m$^2$.day and NaCl rejection of 94.6%.

EXAMPLE 10

The preparation was effected in the same manner as described in Example 9, except that 33.3 g (0.412 mole) of pyridine was used in place of di-n-propylamine. The water flux of the resulting membrane was 0.66 m$^3$/m$^2$.day and the NaCl rejection thereof was 94.6%.

EXAMPLE 11

As asymmetric membrane was obtained in the same manner as described in Example 9, except that 62.6 g (0.412 mole) of 1,8-diazabicyclo[5.4.0]undecene-7 was used in place of di-n-propylamine. The water flux and NaCl rejection of the resulting membrane were 0.57 m$^3$/m$^2$.day and 94.6%, respectively.

EXAMPLE 12

An asymmetric membrane was obtained in the same manner as described in Example 9, except that 35.8 g of piperidine was used in place of di-n-propylamine. The water flux and NaCl rejection of the resulting membrane were 0.71 m$^3$/m$^2$.day and 91%, respectively.

EXAMPLE 13

Di-n-propylamine salt of phenoxy resin sulfate was obtained in the same manner as described in Example 1, step (i), except that the amount of chlorosulfuric acid was 19.1 g and 42.5 g (0.412 mole) of di-n-propylamine was used in place of pyridine. The sulfation degree of the resulting polymer was 0.55 from S analysis. Forty grams of the thus-obtained polymer was dissolved in a solution of 30 g of 2-methoxyethanol, 25 g of acetone and 5 g of water. An asymmetric membrane was prepared from the solution in the same manner as described in Example 5. The water flux and NaCl rejection of the resulting membrane were 1.85 m$^3$/m$^2$.day and 92.2%, respectively.

EXAMPLE 14

The membrane obtained in Example 13 was immersed at 25° C. for 26 hours in an aqueous solution containing 0.5 wt. % of dimethylolurea condensate (Mirben Resin SKH made by Showa Kohbunshi K.K.) in order to react. Then, after the membrane was immersed in 0.1 wt. % NaOH aqueous solution for two days, it was washed with water. Subsequently, its membrane properties were examined in the same manner as described in Example 5. The water flux and NaCl rejection were 0.75 m$^3$/m$^2$.day and 90.0%, respectively. After the membrane was thus cross-linked, it was immersed in N,N'-dimethylformamide. It was observed that the membrane swelled to 1.5 times size in 10 minutes. On the other hand, a membrane that had not been cross-linked was completely soluble in N,N'-dimethylformamide.

EXAMPLE 15

The same treatment as described in Example 14 was conducted except that an aqueous solution containing 0.5 wt. % of hexamethoxymethylolmelamine (Mirben Resin SM607 made by Showa Kohbunshi K.K.), 0.1 wt. % of citric acid and 3.3 wt. % of acetone was used. The water flux and NaCl rejection of the resulting membrane were 1.05 m$^3$/m$^2$.day and 89.0%, respectively. After the membrane was immersed in N,N'-dimethylformamide for 10 minutes, it was found to be swelled to 2.5 times its original size. Further, the "−m" value was calculated when the membrane had been subjected to a continuous operation for 400 hours. The "−m" value is obtained from the following equation $$-m = \frac{\log F_t - \log F_0}{\log t},$$

wherein $F_0$ is the initial water permeation rate, $F_t$ is a water permeation rate after continuous operation continues for a period of time t, and t is a period of time for operation (hours). As the "−m" value becomes smaller, it signifies that the decrease of the water permeation rate is smaller. The "−m" value of this case was 0.032, which is smaller than in the case with a membrane that has not been cross-linked, namely, 0.096.

EXAMPLE 16

The same treatment as described in Example 15 was conducted except that glycerine-diglycidyl ether was used in place of hexamethoxymethylolmelamine. The resulting membrane had a water flux of 1.07 m$^3$/m$^2$.day and NaCl rejection of 88.9%. Then, it was immersed in N,N'-dimethylformamide for 10 minutes and it was found that it had been swelled to a 1.6 times its original size. The "−m" value thereof was 0.081 when operation had been continued for 400 hours.

EXAMPLE 17

Di-n-butylamine salt of phenoxy resin sulfate was obtained in the same manner as described in Example 9 except that 54.1 g (0.412 mole) of di-n-butylamine was used in place of di-n-propylamine. The sulfation degree thereof was 0.55 from S analysis. Forty grams of the resulting polymer was dissolved in a solution of 36 g of 2-methoxyethanol, 14 g of acetone, 5 g of ethyleneglycol and 5 g of water. An asymmetric membrane was obtained from the polymer solution in the same manner as described in Example 5 and it was found to have a water flux of 0.38 m³/m².day and NaCl rejection of 91.0%.

The embodiments of the invention in which an exclusive property or privilege is claimed are defined as follows:

1. A semipermeable membrane consisting essentially of a water-insoluble, membrane-forming polymer having the formula

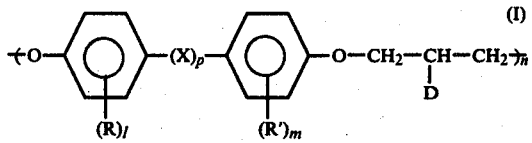
(I)

wherein R and R' are halogen, nitro, methyl or ethyl, X is a divalent group selected from the group consisting of methylene, ethylene, isopropylidene, ether (—O—), carbonyl (—CO—), sulfide (—S—), sulfoxide (—SO—) and sulfone (—SO$_2$—), l and m are integers of from 0 to 4, p is 0 or 1, and n is an integer of from 100 to 1000, and wherein from 15 to 90% of said D groups are sulfuric acid groups or salts thereof with an alkali metal, ammonia or a nitrogen-containing basic organic compound, and the balance of said D groups are hydroxyl groups.

2. A semipermeable membrane as set forth in claim 1, wherein from 20 to 85% of said D groups are sulfuric acid groups or said salts thereof.

3. A semipermeable membrane as set forth in claim 1, wherein (X)$_p$ is selected from the group consisting of SO$_2$ and

and l and m are zero.

4. A semipermeable membrane as set forth in claim 1, which is formed on the surface of a porous membrane.

5. A semipermeable membrane as set forth in claim 1, wherein said nitrogen-containing basic organic compound is selected from the group consisting of di-n-propylamine, di-n-butylamine, pyridine, 1,8-diazabicyclo [5.4.0] undecene-7 and piperidine.

6. A semipermeable membrane as set forth in claim 1, wherein said nitrogen-containing basic organic compound is selected from the group consisting of ethanolamine, triethylamine and diethylamine.

7. A polymer having the formula

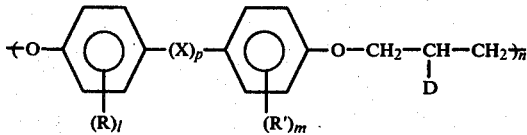

wherein R and R' are halogen, nitro, methyl or ethyl and R and R' can be the same or different, X is methylene, ethylene, isopropylidene, —O—,

—S—, —S(O)— or —S(O) l and m are integers of from 0 to 4, p is 0 or 1, n is integer of from 100 to 1000, and from 10 to 85 percent of the D groups of the polymer are hydroxyl and the balance of the D groups of the polymer are

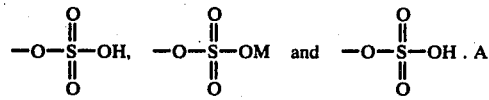

wherein M is an alkali metal and A is ammonia or a nitrogen-containing basic organic compound.

8. A polymer according to claim 7 in which p is 1.

9. A polymer according to claim 8 in which X is —S(O)$_2$— or

10. A polymer according to claim 9 in which l and m are 0.

11. A semipermeable membrane as set forth in claim 1 wherein said nitrogen-containing basic organic compound is selected from the group consisting of methylamine, ethylamine, propylamine, isopropylamine, butylamine, isobutylamine, sec-butylamine, tert-butylamine, pentylamine, isopentylamine, hexylamine, 2-ethylhexylamine, laurylamine, dimethylamine, diethylamine, dipropylamine, diisopropylamine, di-n-butylamine, N-methylethylamine, N-ethylisobutylamine, trimethylamine, triethylamine, N,N-dimethylpropylamine, tributylamine, N-ethyl-N-methylbutylamine, mono-, di- and tri-ethanolamine, diethylamino ethanol, urea, β-dimethylaminopropionitrile, tetramethylammonium tetraethylammonium, cyclohexylamine, N,N-dimethylcyclohexylamine dicyclohexylamine, aniline, o-toluidine, m-toluidine, p-toluidine o-ethylaniline, m-ethylaniline, p-ethylaniline, p-isopropylaniline, p-tert-butylaniline, N-methylaniline, N-ethylaniline, N,N-dimethylaniline, trimethylphenyl ammonium, ethyldimethylphenyl ammonium, benzylamine, α-methylbenzylamine, pyrrole, 1-methylpyrrole, indole, pyridine, α-picoline, β-picoline, γ-picoline, 2-ethylpyridine, quinoline, piperidine, 1-methyl piperidine, 2-methylpiperidine, 1,8-diazabicyclo[5.4.0]undecene-7 and morpholine.

12. A polymer according to claim 7 wherein said nitrogencontaining basic organic compound is selected from the group consisting of methylamine, ethylamine, propylamine, isopropylamine, butylamine, isobutylamine, sec-butylamine, tert-butylamine, pentylamine, isopentylamine, hexylamine, 2-ethylhexylamine, laurylamine, dimethylamine, diethylamine, dipropylamine, diisopropylamine, di-n-butylamine, N-methylethylamine, N-ethylisobutylamine, trimethylamine, triethylamine, N,N-dimethylpropylamine, tributylamine, N-ethyl-N-methylbutylamine, mono-, di- and tri-ethanolamine, diethylaminoethanol, urea, β-dimethylaminopropionitrile, tetramethylammonium, tetraethylammonium, cyclohexylamine, N,N-dimethylcyclohexylamine, dicyclohexylamine, aniline, o-toluidine, m-toluidine, p-toluidine, o-ethylaniline, m-ethylaniline, p-ethylaniline, p-isopropylaniline, p-tert-butylaniline, N-methylaniline, N-ethylaniline, N,N-dimethylaniline, trimethylphenyl ammonium, ethyldimethylphenyl ammonium, benzylamine, α-methylbenzylamine, pyrrole, 1-methylpyrrole, indole, pyridine, α-picoline, β-picoline, γ-picoline, 2-ethylpyridine, quinoline, piperidine, 1-methylpiperidine, 2-methylpiperidine, 1,8-diazabicyclo[5.4.0]undecene-7 and morpholine.

* * * * *

UNITED STATES PATENT OFFICE
CERTIFICATE OF CORRECTION

Patent No. 4 200 726                     Dated  April 29, 1980

Inventor(s)  Kiyoshi Ishii et al

It is certified that error appears in the above-identified patent and that said Letters Patent are hereby corrected as shown below:

Column 18, line  6;  change "-S(O)$\ell$" to --- -S(O)$_2$-, $\ell$---.

Column 18, line  7;  change "n is integer" to

---n is an integer---.

Column 18, line 14;  change "and" to ---or---.

Column 18, line 46;  after "p-toluidine" insert a comma (,).

Column 18, line 56;  change "nitrogencontaining" to

---nitrogen-containing---.

Signed and Sealed this

Fourth Day of November 1980

[SEAL]

Attest:

SIDNEY A. DIAMOND

Attesting Officer    Commissioner of Patents and Trademarks